May 14, 1968 F. M. MINKS 3,383,555
REGULATED CAPACITOR DISCHARGE IGNITION SYSTEM
Filed March 1, 1965
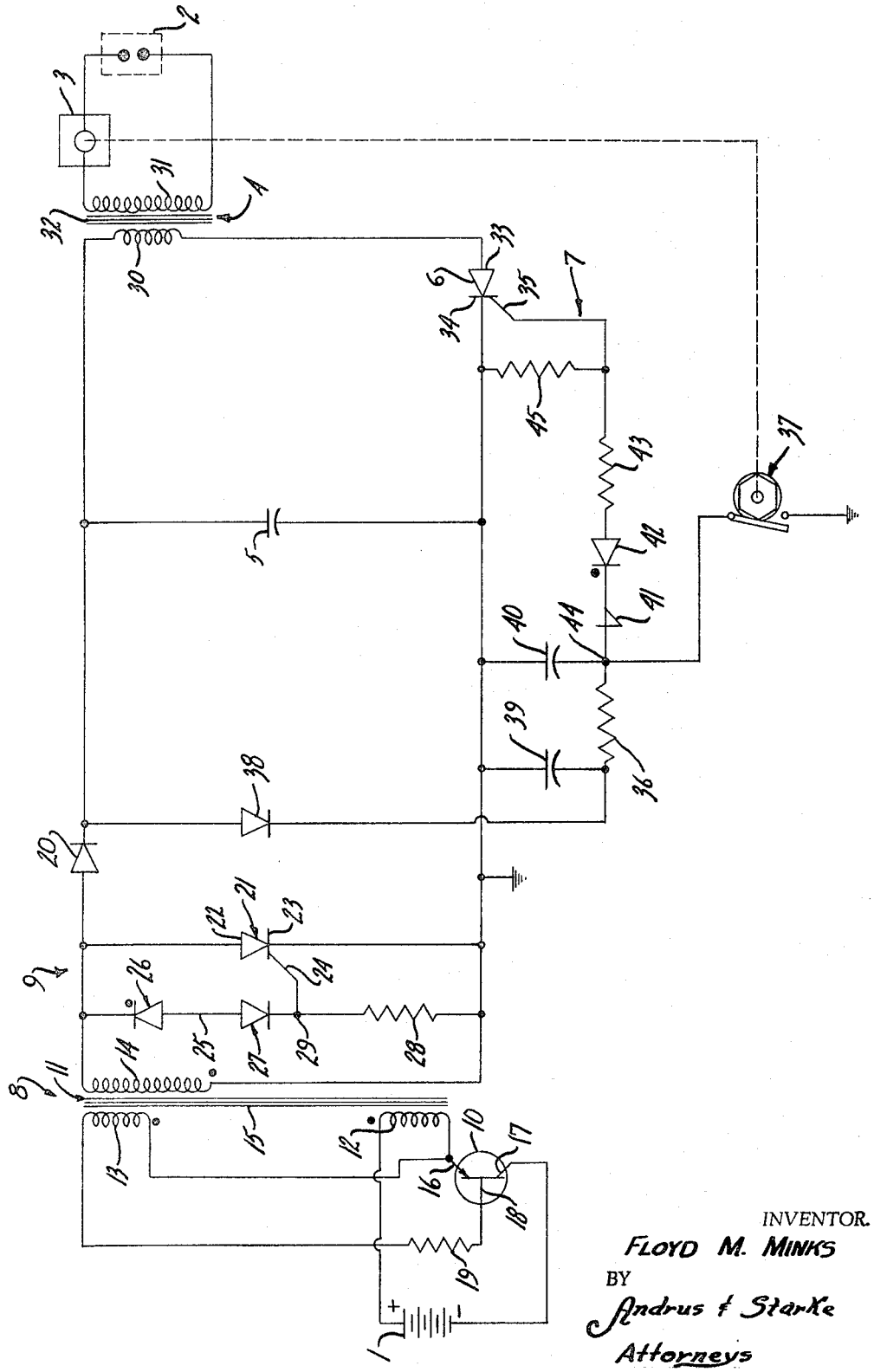
INVENTOR.
FLOYD M. MINKS
BY
Andrus & Starke
Attorneys

United States Patent Office

3,383,555
Patented May 14, 1968

3,383,555
REGULATED CAPACITOR DISCHARGE
IGNITION SYSTEM
Floyd M. Minks, Port Washington, Wis., assignor to Kiekhaefer Corporation, Fond du Lac, Wis., a corporation of Delaware
Filed Mar. 1, 1965, Ser. No. 435,832
13 Claims. (Cl. 315—209)

ABSTRACT OF THE DISCLOSURE

In a capacitor discharge ignition system, the capacitor is connected to a blocking oscillator for charging. A silicon controlled rectifier is connected across the output winding of the blocking oscillator. A Zener diode device in series with a resistor is also connected in parallel with the silicon controlled rectifier and the gate of the latter is connected to the junction of the resistor and the Zener diode. In operation, the capacitor was charged to the maximum level established by the Zener diode which will then trigger and fire the SCR to provide a regulated voltage on the capacitor. The discharge circuit for the capacitor includes a pulse transformer and a silicon controlled rectifier. The gate of the latter silicon controlled rectifier is connected to a trigger circuit. The trigger circuit includes a Zener diode and a voltage breakdown switch connected to the junction of a capacitor and a resistor. The same junction is connected to ground by the points. The resistor is connected to the output oscillator by a diode and to the return side of the oscillator by a capacitor.

In operation, when the points close, the latter capacitor is charged. When the points open, the capacitor discharges through the resistor and the first named capacitor. When the voltage across the latter reaches a selected level, it triggers the "Shockley" diode and the capacitor discharges into the gate of the silicon controlled rectifier to thereby discharge the main capacitor.

---

This invention relates to a capacitor discharge ignition system for internal-combustion engines and has particular reference to an ignition discharge circuit for generating a high voltage pulse under varying battery conditions.

Electronic ignition systems for internal-combustion engines have been suggested for a number of years. Recent developments have been directed to various circuits for charging a capacitor from the battery through amplifying circuits preferably employing solid state devices. The capacitor is periodically and rapidly discharged through the induction coil of the usual ignition unit by a properly timed switch means. The necessity for switching of the discharge circuit has generally been fairly complicated and expensive. Although thyratron gas tubes for example could satisfactorily be employed, their physical characteristics were not conducive to practical applications. With the development of the silicon controlled rectifier however which generally is a functional solid state equivalent, a satisfactory discharge switching means was provided.

The present invention is particularly directed to such a semiconductor ignition system and particularly is directed to an improvement including a regulation of the charging of the capacitor to provide a selected output even though the input changes by a factor of five to one or more. The present circuit will essentially eliminate the variation in engine performance with high and low battery voltages. Consequently, considerations of over voltage damage to output circuit components are automatically taken into consideration and eliminated. Further, with the regulation of the present invention, a relatively flat speed output characteristic is provided. Thus, the output can be made to be essentially flat anywhere between zero to a maximum high speed exceeding one kilocycle. The present invention further discloses an improved discharge switching circuit whereby the breaker points or other engine driven element is connected directly in the firing circuit of a silicon controlled rectifier or the like. In this aspect of the present invention, a delay circuit is incorporated into the firing circuit to prevent misfiring of the discharge circuit by short duration signals such as those caused by point bounce.

The drawing furnished herewith illustrates the above features and advantages as well as others which will be clear from the following description.

The drawing illustrates a semiconductor ignition system suitable for use in connection with internal-combustion engines and the like.

Referring to the drawing, the system is powered from a direct current source such as a low voltage battery 1 of six, twelve or twenty-four volts which is widely employed in automobiles, trucks, outboard motors or other similar prime movers. In the illustrated embodiment of the invention, a single spark gap 2 is illustrated forming the part of a combustion chamber of the prime mover. In multicylinder engines, a plurality of spark gaps will be employed with a distributor 3, shown in block diagram, provided to sequentially distribute the power to the various gaps in accordance with known practice. In accordance with the present invention, a pulse transformer 4 couples a capacitor discharge system to the gaps. The system includes a main capacitor 5 connected to the pulse transformer 4 through a silicon controlled rectifier 6. A firing control circuit 7 is connected to rectifier 6 to provide controlled firing thereof in timed relation to the operation of the internal-combustion engine and thereby cause proper transfer of energy from capacitor 5 to the gap or gaps 2.

The capacitor 5 in the illustrated embodiment is charged from battery 1 through an oscillator 8 which connects the battery 1 to capacitor 5 with the energy transfer to capacitor 5 regulated by an energy regulator 9 which is interposed between the oscillator 8 and the capacitor 5.

The operation of the circuit briefly includes oscillator 8 drawing power from the battery 1 and transferring it to the capacitor 5 to charge it to a selected voltage. The firing control unit 7 is operated in synchronism with the distrubutor 3 and the movement of the pistons, not shown, of the internal-combustion engine to provide for proper closing of the discharge circuit to provide a pulse train of the energy from capacitor 5 to the pulse transformer 4 and therefrom to gap 2. The power output of the oscillator 8 is such that the capacitor 5 is charged to its full value after each discharge and before the time required for a subsequent discharge.

When the capacitor 5 is charged to the required value, the regulator 9 is triggered to present a very low load voltage to the oscillator and to thus increase the energy transfer time. As a result, the repetition rate of the energy input to the oscillator is reduced to maintain the voltage at the selected level. This therefore provides for charging of the capacitor to the same level regardless of the input level and maintains such an output characteristic irrespective of engine speed, up to a maximum speed determined by the power capability of the oscillator 8 for a given input voltage at battery 1.

More particularly in the illustrated embodiment of the invention, the oscillator 8 is illustrated as a known circuit having a transistor 10, shown as a PNP variety, connected between the battery 1 as a source and an oscillating transformer 11 which includes a main winding 12, a feedback winding 13 and a transfer winding 14 magnetically interconnected in close coupling by a core 15, shown diagrammatically.

The transistor 10 includes an emitter 16, a collector 17 and a base 18 shown in accordance with the conventional diagram. The emitter 16 is connected to the one side of the transformer main winding 12, the opposite side of which is connected to the positive terminal of the battery 1 shown by the conventional plus sign. The collector 17, forming the other load terminal or electrode, is connected to the opposite or negative side of the battery 1. The base 18 which constitutes the signal input terminal is connected in series with a resistor 19 and the feedback winding 13 to the emitter 16 to thus complete the input side of the oscillating circuit. The output of oscillator 8 is connected by the transfer winding 14 to the energy regulator 9 and to the capacitor 5 with the connection to the capacitor being in series with a blocking diode 20.

Generally, in operation, the oscillator 8 works in a known manner as follows. When the battery circuit is first completed, noise or any other similar disturbance in the base circuit of transistor 10 will result in a decrease in the voltage between the emitter 16 and collector 17 and establish an initial voltage across the main winding 12. This voltage is inductively reflected in the feedback winding 13. As a result, emitter current will begin to flow and the voltage across the main winding 12 will rapidly rise to the battery voltage less the saturation voltage of the transistor 10. During this period, the current in the transfer winding 14 is essentially zero because of the reverse or blocking action of the diode 20. Thus, the increasing current serves primarily to store energy in the air gap, not shown, of the transformer core 15.

While the current through the collector 17 is increasing, the current through the base 18 of transistor 10 is almost constant. The value of the base current is generally determined by the voltage of battery 1, the relative number of turns of windings 12 and 13 and the resistance of the base resistor 19, and the saturation voltages of transistor 10. When the collector current rises to the maximum level that the transistor 10 can conduct in the saturation region, at the above mentioned base current, the voltage between the emitter 16 and the collector 17 begins to increase rapidly. The voltage across winding 12 therefore decreases and the voltage reflected in the feedback winding 13 decreases. The reflected decreased voltage results in a decrease in the base current and in turn the collector current in a degenerative manner. This causes a rapid decrease in current through the main winding 12. The ampere turns associated with winding 12 are transferred as a current increase in the transfer winding 14. Energy is thus transferred into the capacitor 5 until it reaches a selected voltage after which regulator 9 maintains the voltage at a selected level.

The illustrated energy regulator 9 includes a silicon controlled rectifier 21 of the usual construction and includes an anode 22 and a cathode 23 connected to opposite sides of the transfer winding 14. The anode 22 is connected to the side of the transformer that is positive during the energy transfer cycle and the cathode 23 is connected to the opposite side such that it can conduct at a selected point during the transfer cycle. The silicon controlled rectifier 21 further includes the well known firing terminal or gate 24. A voltage dividing branch 25 consisting of a Zener diode 26 and a conventional diode 27 connected in back-to-back relationship and in series with a resistor 28 is connected in parallel with the silicon controlled rectifier 21 across the transfer winding 14. The gate 24 is connected to a firing control junction 29 between the resistor 28 and the back-to-back diodes 26 and 27 in branch 25.

In operation, when oscillator 8 has completed a sufficient number of rapid cycles to charge the capacitor 5 to the selected level, the instantaneous voltage drop appearing across the voltage dividing branch 25 is such that the Zener diode 26 conducts. This produces a positive gate current into the gate 24 of the silicon controlled rectifier 21 which will then turn on. As soon as the silicon controlled rectifier 21 is turned on, it presents a low resistance path to the transfer winding 14 of the oscillator 8 which increases the energy transfer time. As a result, the repetition rate of the oscillator 8 and therefore the average energy input to the main winding 12 are reduced so as to maintain the voltage across the capacitor 5 at the selected level. This capacitor voltage is maintained until the firing of the silicon controlled rectifier 6 discharges the energy into the pulse transformer 4.

The illustrated transformer 4 is shown diagrammatically as including a primary winding 30 connected across the capacitor 5 in series with the silicon controlled rectifier 6. The secondary 31 of transformer 4 is magnetically coupled to the primary winding 30 through a suitable magnetic core 32. Although any pulse transformer design can be employed, a highly satisfactory system or unit is shown in applicant's copending application entitled Transformer filed on June 15, 1964 with Ser. No. 374,925 and assigned to a common assignee as this application. In any event, when the silicon controlled rectifier 6 is fired, the voltage across the primary winding 30 is reflected in the secondary 31 and provides a pulse to the spark gap 2 to cause firing thereof and operation of the internal-combustion engine in accordance with known theories of operation.

The illustrated silicon controlled rectifier 6 is any conventional variety similar to silicon controlled rectifier 21 for example and includes an anode 33 connected to the one side of the transformer winding 30, and the opposite side of which is connected to the positive side of capacitor 5. The cathode 34 of rectifier 6 is connected directly to the opposite or negative side of the capacitor 5. The silicon controlled rectifier 6 is thereby connected to conduct current from the capacitor 5 through the winding 30. The silicon controlled rectifier 6 holds the circuit open in both directions until a signal is applied to gate 35 and fires the silicon controlled rectifier 6 which will then conduct in the direction to discharge capacitor 5.

The illustrated firing circuit 7 includes a resistor 36 connected in series with the breaker points or other trigger means 37 and a diode 38 between the normally positive side of capacitor 5 and ground. A capacitor 39 is connected at one side to ground and at the other side to the junction of diode 38 and resistor 36. A timing capacitor 40 is connected in parallel with capacitor 39 and resistor 36 and thus also in series with trigger means 37. In the illustrated embodiment of the invention, a "Shockley" diode 41 is connected in back-to-back series relation with a Zener diode 42 and with a resistor 43 between gate 35 and the common junction 44 of the resistor 36, the capacitor 40 and the trigger means 37. A resistor 45 is also connected between the gate 35 and the cathode 34.

When the converter 8 operates to charge the capacitor 5, it also charges capacitor 39 which provides a direct current firing source. Current from this source flows through resistor 36 and trigger means 37 to ground. The voltage on the "Shockley" diode 41 is at ground less the voltage drop across trigger means 37 which is insufficient to cause it to conduct. When the trigger means 37 opens, the current flowing from the capacitor 39 through resistor 36 charges capacitor 40. When the voltage across the capacitor 40 reaches a selected level, the "Shockley" diode 41 switches on and discharges the capacitor 40 producing a triggering pulse through the gate 35 to turn on silicon controlled rectifier 6 and thereby discharge the capacitor 5.

The time constant of resistor 36 and capacitor 39 is long enough to maintain current through the "Shockley" diode 38 above its holding current until the points 37 reclose. However, resistor 45 prevents this small current from firing the silicon controlled rectifier 6. This is necessary to permit recharging of the capacitor 5 and proper circuit operation.

The firing pulse is only generated after a selected time following the opening of the breaker point unit 37. The time for the capacitor 40 to charge to the firing voltage is selected to be longer than any unwanted actuation of the breaker point unit 37 which may be created by contact vibration and bounce. The rate at which the points of unit 37 open and close does not effect the shape or intensity of the output pulse and thus provides for reliability of operation. When the points again close, the voltage at the terminal is reduced to ground and the "Shockley" diode switches off because its holding voltage is above the voltage drop across the trigger means 37 when closed. The Zener diode 42 may be used to insure turn off of the diode 41 if the trigger means 37 has a voltage drop when closed, that approaches or increases the holding voltage of diode 41.

Diode 42 may of course be eliminated whenever the drop across means 37 is sufficiently low to insure turn off of the diode 41.

The operation of the illustrated embodiment of the invention may be briefly summarized as follows.

The breaker point unit 37 is coupled to be driven by the engine in accordance with the known or other suitable systems. The battery 1 provides energy to the oscillator 3 which is transferred in rapid cycles to the capacitors 5 and 39 to charge the capacitor to a selected level. The precise level will be determined by the energy regulator 9. The firing capacitor 39 begins to charge as soon as the breaker point unit 37 opens the ground circuit. A selected time after the points have opened, generally in the order of 100 microseconds, the voltage across the capacitor 40 reaches the selected firing level which switches the "Shockley" diode on and transfers a pulse to the gate 35 of the silicon controlled rectifier 6. This time delay prevents undesirable gate pulses caused by short duration point bounce. As a result, the silicon controlled rectifier 6 conducts and discharges the capacitor 5 to the pulse transformer 4 which in turn provides a pulse to gap 2.

The present invention thus provides a controlled charging of a capacitor to maintain optimum operation almost entirely independently of the level of the voltage source as well as the operating speed of the engine over the ranges selected and determined by the value of the components. Further, it provides a system whereby direct firing of the silicon controlled rectifier can be provided through the operation of the breaker points or the like without any danger of multiple or misfiring as a result of contact bounce and the like. It thus provides a highly improved capacitor discharge ignition system for internal-combustion engines.

Various modes of carrying out the invention are contemplated as being within the scope of the following claims particularly pointing out and distinctly claiming the subject matter which is regarded as the invention.

I claim:

1. In an ignition system for internal-combustion engines and the like having spark forming ignition means in a combustion chamber to be fired at a selected maximum firing rate from a source of energy, comprising:

a capacitor, a charging circuit connected to the capacitor and having input means adapted to be connected to the source, said circuit having power capability to charge said capacitor to a selected firing level in a period less than the firing rate, an electronic energy regulating means in the charging circuit having means to cause the input current to decrease as the input voltage increases and to increase as the speed increases at any given voltage such that power drawn from the source and variations in the level to which the capacitor is charged over a selected operating range of input potential and engine speed is minimized, an output circuit connected to the capacitor and having output means adapted to be connected to ignition means and including a switching means normally preventing conduction through the output circuit, and a firing circuit connected to control the switching means and actuate the switching means to establish conduction through the output circuit for firing of the ignition means.

2. In an ignition system for internal-combustion engines and the like having igniting means in a combustion chamber to be fired from a source of current, comprising:

a capacitor, a blocking oscillator means having an output means connected across the capacitor and having input means adapted to be connected to the source and including electronic regulation means to cause the input current to the oscillator to decrease as the input voltage increases and to increase as the speed increases at any given voltage such that power drawn from the source and the level to which the capacitor is charged essentially constant over a selected range of engine speed and input voltage, an output circuit connected to the capacitor and having output means adapted to be connected to the igniting means for firing thereof and including control switch means, and a firing circuit connected to the switch means for actuating the switch means and discharging the capacitor to the output means of the output circuit to create proper operation of the engine.

3. In an ignition system for internal-combustion engines and the like having igniting means in a combustion chamber to be fired from a source of direct current, comprising:

a capacitor, an oscillator having an output means connected across the capacitor and having input means adapted to be connected to the source, an energy regulating means connected across the output means and responsive to a selected level of the capacitor to reduce the energy transfer time of the oscillator and hold the capacitor at the selected level, an output circuit connected to the capacitor and having output means adapted to be connected to the igniting means for firing thereof and including control switch means, and a firing circuit connected to control the switching means and actuate it to cause firing of the ignition means.

4. The system of claim 3 wherein said oscillator includes an output winding and said energy regulating means includes a regulating gate controlled switch means connected directly across the output winding of the oscillator and a voltage sensitive circuit to trigger the regulating switch means when the capacitor voltages reach the selected level.

5. The system of claim 4 wherein said voltage sensitive circuit includes a Zener diode and a current directing diode connected in opposite directions and a resistor connected in series therewith with the regulating switch means connected to the junction of the resistor and the diode, said current directing diode being polarized to conduct in the direction as the charging current to the capacitor.

6. In an ignition system for internal-combustion engines and the like having a source of voltage and spark means in a combustion chamber, comprising:

a capacitor, a charging circuit connected to the capacitor and having input means adapted to be connected to the source, an output circuit connected to the capacitor and having output means adapted to be connected to spark means for firing thereof and including a gate controlled polarized switch means having a control gate for turning the switch means on, and timing means driven in synchronism with the engine and in timed relation to the timing of the firing of the spark means and connected in a circuit to said control gate, said timing means having a first position for resetting the gate controlled polarized switch means to a blocking condition and having a second position actuating the switch means to discharge the capacitor and a time delay means connected to said timing means to delay the actuation of the switch means after establishment of the second position and thereby eliminating misfiring caused by abnormally short duration operation of the timing means to said second position.

7. In an ignition system for internal-combustion engines and the like having a source of voltage and spark means in a combustion chamber, comprising:

a capacitor, a charging circuit connected to the capacitor and having input means adapted to be connected to the source, an electronic energy regulating means in the charging circuit controlling the charged level of the capacitor, an output circuit connected to the capacitor and having output means adapted to be connected to spark means for firing thereof and including a gate controlled polarized switch means having a control gate for turning the switch means on, and timing means driven in synchronism with the engine and in timed relation to the timing of the firing of the spark means and connected in a circuit to said control gate, said timing means having a first position resetting the gate controlled polarized switch means to a blocking condition and having a second position actuating the switch means and to discharge the capacitor, and a time delay means connected to said means to delay the actuation of the switch means after establishment of the second position and thereby eliminating misfiring caused by abnormally short duration operation of the timing means to said second position.

8. In an ignition system for internal-combustion engines and the like having a source of voltage and igniting means in a combustion chamber, comprising:

a capacitor, a charging circuit connected to the capacitor and having input means adapted to be connected to the source, an energy regulating means in the charging circuit controlling the charged level of the capacitor, an output circuit connected to the capacitor and having output means adapted to be connected to igniting means for firing thereof and including a gate controlled switch means normally preventing firing of the switch means, a firing circuit including an energy storage means connected to the output of the charging circuit, a voltage sensitive circuit connected to the gate controlled switch means, a time delay circuit connecting said storage means to said voltage sensitive circuit, and a breaker point means driven by the engine and connected to the time delay circuit to reset the energy storage means to an initial standby position and to initiate discharge of the storage means through the time delay circuit.

9. In an ignition system for internal-combustion engines and the like having igniting means in a combustion chamber, comprising:

a capacitor, a charging circuit connected to the capacitor and having input means adapted to be connected to the source, an energy regulating means in the charging circuit controlling the charged level of the capacitor, an output circuit connected to the capacitor and having output means adapted to be connected to igniting means for firing thereof and including a gate controlled switch means with a gate to control firing of the switch means, said gate controlled switch means having a minimum holding current to maintain conduction after having been fired to conduction, a firing circuit including a main capacitor connected in parallel with a series connected timing resistor and capacitor between the output of the charging circuit and a voltage reference means and having a voltage sensitive switch means connecting the junction of the timing resistor and capacitor to the gate controlled switch means, said gate controlled switch means being turned on in response to a selected turn-on current through the voltage sensitive switch means, and a reset switch means driven by the engine and connected to said junction to reset the capacitor to a reference below the holding current of said voltage sensitive switch means.

10. The ignition system of claim 9 wherein said switch means has a voltage drop therethrough when in the closed position, and the voltage sensitive switch means is a "Shockley" diode selected to have a holding voltage greater than the voltage drop across the switch means.

11. In an ignition system for internal-combustion engines and the like having igniting means in a combustion chamber and a source of voltage, comprising:

a main capacitor, a charging circuit connected to the capacitor and having input means adapted to be connected to the source of voltage for charging of the capacitor with a selected polarity, an energy regulating means in the charging circuit controlling the charged level of the capacitor, an output circuit connected to the capacitor and having output means adapted to be connected to igniting means for firing thereof and including a silicon controlled rectifier having a cathode connected to the low voltage side of the capacitor and an anode and a gate, a firing circuit including a firing capacitor connected in series with a diode across the main capacitor for simultaneous charging, a timing resistor and a timing capacitor connected in series across the firing capacitor and connected to the gate of the silicon controlled rectifier by a transfer branch, said transfer branch including a voltage sensitive switch means connected in series with resistance means to the gate, and a breaker point means driven by the engine and connected to a ground connection and to the connection between the timing capacitor and the timing resistor to turn off the voltage sensitive switch means and permit the recharge of the firing capacitor.

12. In an ignition system for internal-combustion engines and the like employing a spark plug fired from a battery, comprising:

a pulse transformer having an output winding adapted to be connected to the spark plug and having an input winding, an energy storage capacitor to be charged to a selected voltage of a selected polarity, a gate controlled rectifier connected in a series discharge circuit with said energy storage capacitor and said input winding and having a firing gate terminal, an oscillator having input means adapted to be connected to the battery and having an oscillator transformer including a plurality of windings one of which is an energy transfer winding connected to the capacitor, a diode connected in series between the connection of the transfer winding and the capacitor, a silicon controlled rectifier connected across a winding of the oscillator transformer and having a firing gate terminal, a voltage reference means connected between the anode and gate of said silicon controlled rectifier, a firing capacitor connected across the energy storage capacitor in series with a diode, a timing resistor and capacitor connected in series across the firing capacitor, a voltage sensitive switch means connected to the gate terminal and to the connection between the timing resistor and capacitor, and a driven switch unit connected to the connection between the timing resistor and capacitor and to a ground connection and adapted to be driven by the engine.

13. In an ignition system for internal-combustion engines and the like employing a spark plug, comprising:

a pulse transformer having an output winding connected to the spark plug and having an input winding, a capacitor adapted to be charged to the order of at least 100 volts, a silicon controlled rectifier connected in series discharge circuit with said capacitor and said input winding and having a firing gate terminal, an oscillator having input means adapted to be connected to the battery and having an oscillator transformer including a plurality of windings one of which is an energy transfer winding connected to the capacitor, said oscillator having power capability to charge the energy storage capacitor at a repetition rate greater than the firing rate of the engine, a diode connected in series between the connection of the transfer winding and the capacitor, a silicon controlled rectifier connected across a winding of the oscillator transformer and having a firing gate terminal and a cathode terminal, a voltage divider including a Zener diode and a blocking diode in back-to-back relation and connected in series with a resistor across said silicon controlled rectifier, means connecting said resistor between the gate terminal and cathode terminal, a firing capacitor connected in series with a diode across the energy storage capacitor, a timing circuit connected across the firing circuit and including a timing resistor and a capacitor, a voltage sensitive switch means connected to the gate terminal and to the connection between the timing resistor and capacitor, and a driven switch unit connected to the connection between the timing resistor and capacitor and to a ground connection and adapted to be driven by the engine.

References Cited

UNITED STATES PATENTS

| | | | |
|---|---|---|---|
| 3,131,327 | 4/1964 | Quinn | 315—209 |
| 3,240,198 | 3/1966 | Loudon et al. | 123—148 |
| 3,263,124 | 7/1966 | Stuermer | 315—212 |
| 3,275,884 | 9/1966 | Segall et al. | 315—209 |

JOHN W. HUCKERT, *Primary Examiner.*

D. O. KRAFT, R. F. POLISSACK, *Assistant Examiners.*